United States Patent
Horibata

(10) Patent No.: US 7,675,349 B2
(45) Date of Patent: Mar. 9, 2010

(54) POWER SUPPLY CIRCUIT AND DISPLAY DEVICE THEREWITH

(75) Inventor: Hiroyuki Horibata, Gifu (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 0 days.

(21) Appl. No.: 12/022,883

(22) Filed: Jan. 30, 2008

(65) Prior Publication Data

US 2008/0238535 A1 Oct. 2, 2008

(30) Foreign Application Priority Data

Mar. 27, 2007 (JP) ............... 2007-080918

(51) Int. Cl.
G05F 1/10 (2006.01)
G05F 3/02 (2006.01)

(52) U.S. Cl. ..................... 327/536; 327/537

(58) Field of Classification Search .............. 327/536
See application file for complete search history.

(56) References Cited

U.S. PATENT DOCUMENTS 6,552,712 B1 * 4/2003 Koizumi ................. 345/104
7,208,996 B2 4/2007 Suzuki et al.
2005/0093614 A1 * 5/2005 Lee ......................... 327/536

FOREIGN PATENT DOCUMENTS

JP 2004-146082 5/2004
JP 2005-278378 10/2005

OTHER PUBLICATIONS

Sedra, Adel, Smith, Kenneth, "Microelectronic Circuits," 2004, Oxford University Press, 5th Edition, pp. 238-239.*

* cited by examiner

Primary Examiner—Lincoln Donovan
Assistant Examiner—Daniel Rojas
(74) Attorney, Agent, or Firm—Morrison & Foerster LLP

(57) ABSTRACT

An unnecessary through current is suppressed and insufficiency of an output electric potential and increase in power consumption are suppressed in a power supply circuit using a charge pump method. In order to suppress a reduction in an output electric potential VPP as well as suppressing transient through currents I1 and I2 when a clock DCCLK is inverted, resistances R1 of a wiring 11, R2 of a wiring 12 and R4 of a wiring 14 are set so as to satisfy relations R4>R1 and R4>R2. That is, the through currents I1 and I2 can be suppressed by reducing the resistances R1 and R2 so that electric potentials V1 and V2 are quickly inverted when the clock DCCLK is inverted. Also, the through current I1 can be suppressed to suppress the reduction in the positive output electric potential VPP by setting the resistance R4 to be larger than either of the resistances R1 and R2.

11 Claims, 6 Drawing Sheets

US 7,675,349 B2

POWER SUPPLY CIRCUIT AND DISPLAY DEVICE THEREWITH

CROSS-REFERENCE OF THE INVENTION

This application claims priority from Japanese Patent Application No. 2007-080918, the content of which is incorporated herein by reference in its entirety.

BACKGROUND OF THE INVENTION

1. Field of the Invention

This invention relates to a power supply circuit and a display device provided with the power supply circuit.

2. Description of the Related Art

In an active matrix type liquid crystal display device that is manufactured by a low temperature polysilicon TFT (Thin Film Transistor) technology, a power supply circuit that generates an electric potential to control turning on/off of pixel TFTs has been formed on a glass substrate of a liquid crystal panel in order to reduce a cost of a driver IC (Integrated Circuit).

The power supply circuit includes a positive power supply generation circuit that doubles an inputted positive power supply electric potential VDD by a charge pump method to generate 2VDD and a negative power supply generation circuit that multiplies the positive power supply electric potential VDD by (−1) by the charge pump method to generate a negative power supply electric potential −VDD.

The positive power supply generation circuit and the negative power supply generation circuit are provided with a plurality of charge transfer transistors connected in series and a flying capacitor connected with a connecting node between the charge transfer transistors. Electric charges are transferred from an input side to an output side through the charge transfer devices by switching the charge transfer transistors in synchronization with a clock applied to the flying capacitor.

The active matrix type liquid crystal display device that incorporates the power supply circuit described above on the glass substrate is disclosed in Japanese Patent Application Publication No. 2004-146082.

With the power supply circuit described above, however, there is a case in which an unnecessary through current flows through the charge transfer transistor when the clock is inverted. When the unnecessary through current flows, an efficiency of the power supply circuit is reduced, resulting in insufficiency of output electric potential and increase in power consumption.

SUMMARY OF THE INVENTION

This invention offers a power supply circuit including first and second charge transfer transistors connected in series, a first wiring that provides a drain of the first charge transfer transistor with an input electric potential, an output capacitor connected with a source of the second charge transfer transistor, and a flying capacitor having a first terminal connected with a connecting node between the first and second charge transfer transistors through a second wiring and a second terminal to which a clock is applied, wherein a resistance of the first wiring is larger than a resistance of the second wiring.

DETAILED DESCRIPTION OF THE INVENTION

First Embodiment

Figure 1:
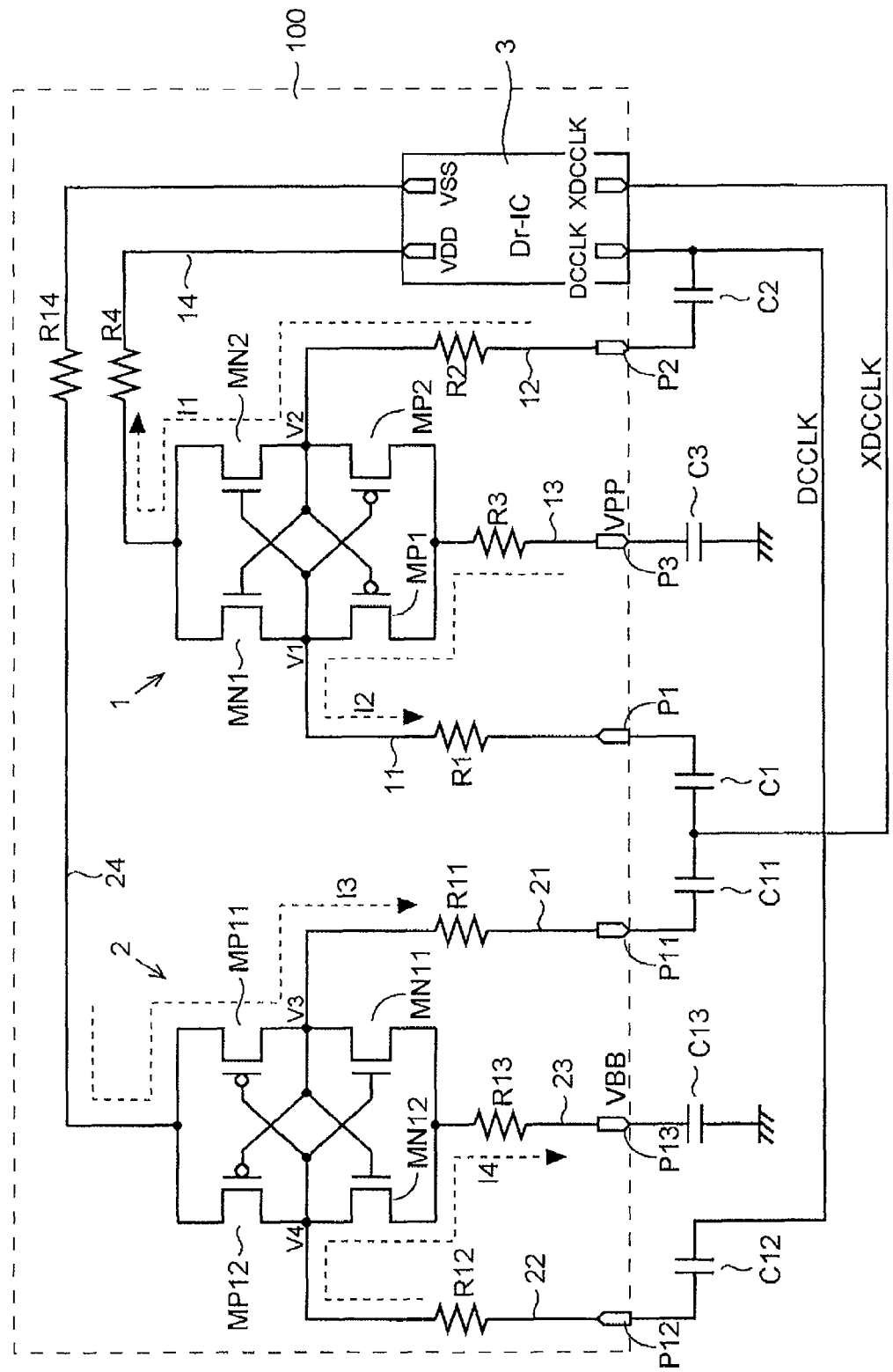
FIG. 1 is a circuit diagram of a power supply circuit according to first and second embodiments of this invention.

FIG. 1 is a circuit diagram of a power supply circuit according to a first embodiment of this invention. The power supply circuit is composed of a positive power supply generation circuit 1 that generates a positive output electric potential VPP=2VDD based on a positive input electric potential VDD and a negative power supply generation circuit 2 that generates a negative output electric potential VBB=−VDD. A driver IC 3 provides these circuits with a power supply electric potential VDD (an example of "input power supply" of this invention), a ground electric potential VSS and dedicated clocks generated in it. The generated power supply electric potentials 2VDD and −VDD are supplied as power supply electric potentials to a vertical drive circuit that generates vertical scan signals which control turning on/off of pixel TFTs disposed in pixels in a pixel region.

The power supply circuit is formed on a glass substrate 100 (liquid crystal panel) in an active matrix type liquid crystal display device by an SOG (system on glass) technology that integrates circuit functions required to drive a liquid crystal by a low temperature polysilicon TFT process technology. Although the vertical drive circuit, a horizontal drive circuit and the pixel region to which horizontal scan signals and the vertical scan signals from the drive circuits are supplied are formed on the glass substrate 100 in addition to the power supply circuit and the driver IC 3, only the power supply circuit and the driver IC 3 are shown in FIG. 1.

In the positive power supply generation circuit 1, an N-channel type charge transfer transistor MN1 (an example of "first charge transfer transistor" of this invention) and a P-channel type charge transfer transistor MP1 (an example of "second charge transfer transistor" of this invention) are connected in series and a terminal of a flying capacitor C1 (an example of "(first) flying capacitor" of this invention) is connected with a connecting node between the charge transfer transistors MN1 and MP1 through a wiring 11 (an example of "second wiring" of this invention). The flying capacitor C1 is an external capacitor disposed outside the glass substrate 100. The wiring 11 connects between the connecting node and the terminal of the flying capacitor C1 through a terminal P1 disposed on the glass substrate 100, and includes a wiring portion on the glass substrate 100 and a mounting wiring portion outside the glass substrate 100. A resistance of the wiring 11 is R1.

Also, an N-channel type charge transfer transistor MN2 (an example of "third charge transfer transistor" of this invention) and a P-channel type charge transfer transistor MP2 (an example of "fourth charge transfer transistor" of this invention) are connected in series and a terminal of a flying capacitor C2 (an example of "second flying capacitor" of this invention) is connected with a connecting node between the charge transfer transistors MN2 and MP2 through a wiring 12 (an example of "third wiring" of this invention). The flying capacitor C2 is an external capacitor disposed outside the glass substrate 100. The wiring 12 connects between the connecting node and the terminal of the flying capacitor C2 through a terminal P2 disposed on the glass substrate 100, and includes a wiring portion on the glass substrate 100 and a mounting wiring portion outside the glass substrate 100. A resistance of the wiring 12 is R2.

Gates of MN1 and MP1 are connected with the connecting node between MN2 and MP2, while gates of MN2 and MP2 are connected with the connecting node between MN1 and MP1.

Drains of the N-channel type charge transfer transistors MN1 and MN2 are connected with each other to form a common drain. The positive power supply electric potential VDD is applied as an input electric potential from the driver IC 3 (input power supply) to the common drain through a wiring 14 (an example of "first wiring" of this invention). The wiring 14 connects between the common drain and a power supply terminal VDD of the driver IC 3, and includes a wiring portion on the glass substrate 100 and a mounting wiring portion outside the glass substrate 100. A resistance of the wiring 14 is R4. Sources of MP1 and MP2 are connected with each other to form a common source (output terminal). The common source is connected with a terminal of an output capacitor C3 (an example of "output capacitor" of this invention) through a wiring 13. Another terminal of the output capacitor C3 is grounded. The wiring 13 connects between the common source and the terminal of the output capacitor C3 through a terminal P3 disposed on the glass substrate 100, and includes a wiring portion on the glass substrate 100 and a mounting wiring portion outside the glass substrate 100. A resistance of the wiring 13 is R3.

A clock DCCLK (an example of "second clock" of this invention) from the driver IC 3 is applied to another terminal of the flying capacitor C2, while a reverse clock XDCCLK (an example of "first clock" of this invention), which is a reverse of the clock of DCCLK, is applied from the driver IC 3 to another terminal of the flying capacitor C1.

Figure 2:
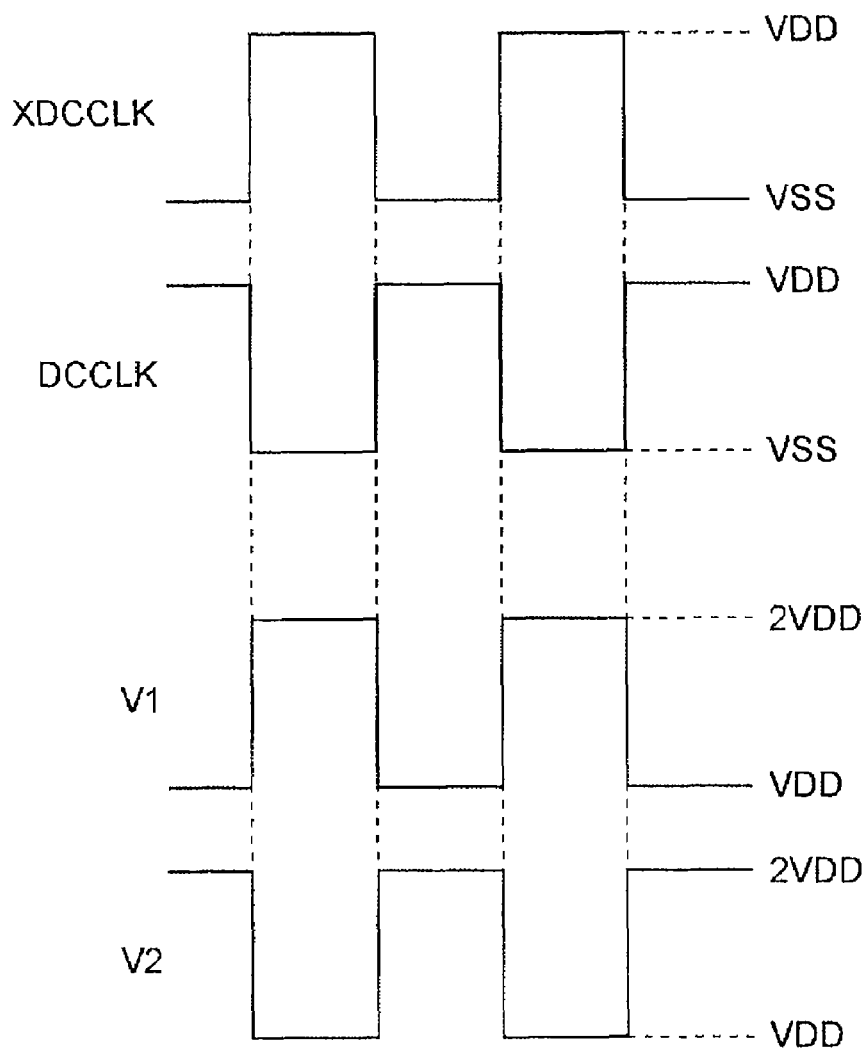
FIG. 2 is a waveform chart showing an operation of a positive power supply generation circuit according to the first and second embodiments of this invention.
Figure 2:
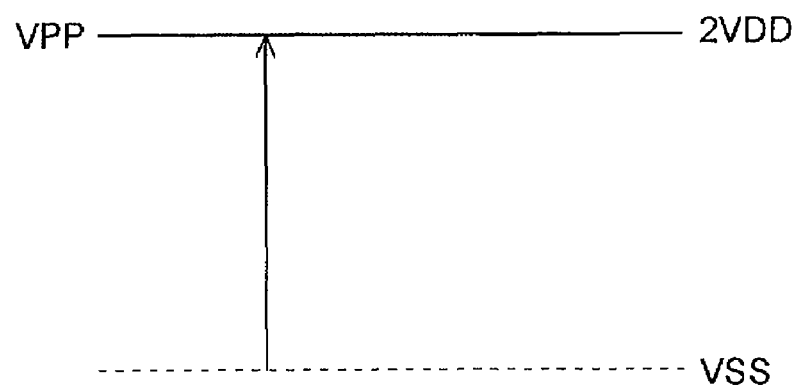

A basic operation of the positive power supply generation circuit 1 described above will be explained referring to FIG. 2. When the clock DCCLK is at an L level (VSS), the reverse clock XDCCLK is at an H level (VDD), MN1 and MP2 are turned off, MN2 and MP1 are turned on, and an electric potential V1 at the connecting node between MN1 and MP1 is boosted by the capacitive coupling through the flying capacitor C1 to 2VDD that is outputted through MP1. Meantime, an electric potential V2 at the connecting node between MN2 and MP2 is charged to VDD.

When the clock DCCLK is at the H level (VDD), MN1 and MP2 are turned on, MN2 and MP1 are turned off, and the electric potential V2 at the connecting node between MN2 and MP2 is boosted by the capacitive coupling through the flying capacitor C2 to 2VDD that is outputted through MP2. Meantime, the electric potential V1 is charged to VDD. That is, the positive output electric potential VPP of 2VDD is outputted by charge transferring alternately from left and right serially connected transistor circuits in the positive power supply generation circuit 2.

However, unnecessary through currents flow through the charge transfer transistors since a rise time and a fall time of the clocks at the connecting node between the MN1 and MP1 and at the connecting node between MN2 and MP2 are increased by delays specified by time constants determined by the resistances R1 and R2 of the wirings 11 and 12 and gate capacitances of the charge transfer transistors MN1, MN2, MP1 and MP2. Causes of the through currents are explained in detail, referring to FIG. 1 and FIG. 2.

As mentioned above, MN1 and MP2 are turned off and MN2 and MP1 are turned on when the clock DCCLK is at the L level. After that, when the clock DCCLK is inverted from the L level to the H level, the electric potential V2 is inverted from VDD to 2VDD while the electric potential V1 is inverted from 2VDD to VDD. However, due to influence of the delays specified by the time constants, the rise time of the electric potential V2 and the fall time of the electric potential V1 are increased. As a result, because MP1 and MN2 are not completely turned off and remain at an ON state for the mean time, an unnecessary through current I1 flows from the wiring 12 to the power supply terminal VDD of the driver IC 3 through MN2 and an unnecessary through current I2 flows from the output terminal to the wiring 11 through MP1.

That is, as MN2 is not turned off, the through current I1 makes it difficult for the electric potential V2 to reach 2VDD and increases the current consumption of the driver IC 3. In addition, as the electric potential V2 does not reach 2VDD, MP1 is not turned off and there is caused the through current I2 that makes it difficult for the electric potential V1 to reach VDD to turn off MN2, resulting in a reduction in the positive output electric potential VPP.

Although this state continues for a while, the electric potential V1 is gradually charged to 5 V and the electric potential V2 is gradually charged to 10 V, and the through currents I1 and I2 ebb away when a voltage Vgs between the drain and the gate of each of the charge transfer transistors MN2 and MP1 becomes equal to or less than a threshold voltage and MN2 and MP1 are turned off.

In this embodiment, therefore, the resistance R1 of the wiring 11, the resistance R2 of the wiring 12 and the resistance R4 of the wiring 14 are set so as to satisfy the following relations in order to suppress the transient through currents I1 and I2 as well as suppressing the reduction in the positive output electric potential VPP when the clock DCCLK is inverted:

R4>R1

R4>R2

That is, the through currents I1 and I2 can be suppressed by reducing the resistances R1 and R2 so that electric potentials V1 and V2 are quickly inverted when the clock DCCLK is inverted. Also, the through current I1 can be suppressed to suppress the reduction in the positive output electric potential VPP by setting the resistance R4 to be larger than the resistances R1 and R2. In order to get enough effect to suppress the through currents I1 and I2 and to suppress the reduction in the positive output electric potential VPP, it is confirmed by experiments to be preferable that the resistance R4 is equal to or larger than 1.5 times of each of the resistances R1 and R2.

Figure 3:
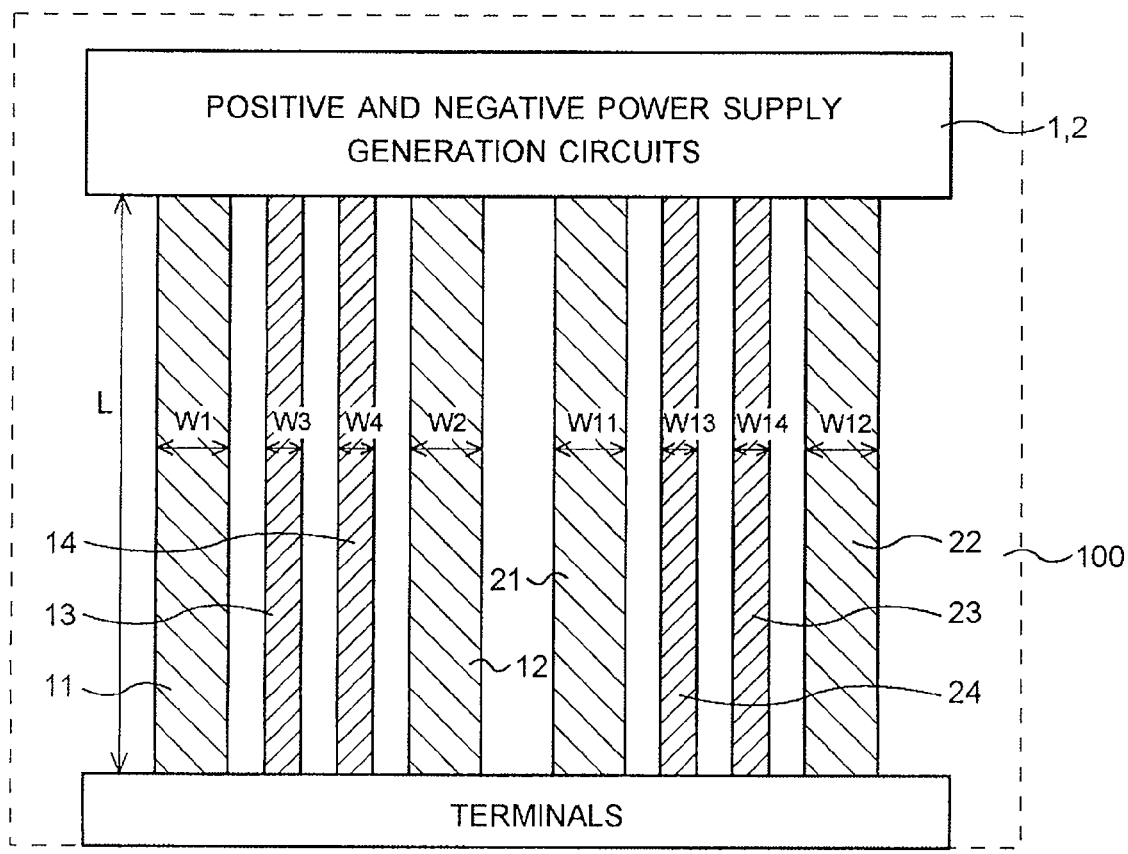
FIG. 3 shows a layout of wirings of the power supply circuit according to the first and second embodiments of this invention.

The wirings 11, 12 and 14 can be formed of aluminum wirings on the glass substrate 100, for example. The wirings 11 and 12 are disposed between the positive power supply generation circuit 1 and the terminals P1 and P2, as shown in FIG. 3. The wiring 14 is disposed between the positive power supply generation circuit 1 and the power supply terminal VDD of the driver IC 3. Lengths L of the wirings 11, 12 and 14 are approximately equal to each other. The resistances R1, R2 and R4 can be adjusted to satisfy the relations described above by adjusting widths of the wirings 11, 12 and 14. That is, a width W1 of the wiring 11, a width W2 of the wiring 12 and a width W4 of the wiring 14 are set to satisfy following relations:

W4<W1

W4<W2

Next, a circuit structure of the negative power supply generation circuit 2 will be explained referring to FIG. 1. An N-channel type charge transfer transistor MN11 and a P-channel type charge transfer transistor MP11 are connected in series and a connecting node between them is connected with a terminal of a flying capacitor C11 through a wiring 21. The flying capacitor C11 is an external capacitor. The wiring 21 connects between the connecting node and the terminal of the flying capacitor C11 through a terminal P11 disposed on the glass substrate 100, and includes a wiring portion on the glass substrate 100 and a mounting wiring portion outside the glass substrate 100. A resistance of the wiring 21 is R11.

An N-channel type charge transfer transistor MN12 and a P-channel type charge transfer transistor MP12 are connected in series and a connecting node between them is connected with a terminal of a flying capacitor C12 through a wiring 22. The flying capacitor C12 is also an external capacitor disposed outside the glass substrate 100. The wiring 22 connects between the connecting node and the terminal of the flying capacitor C12 through a terminal P12 disposed on the glass substrate 100, and includes a wiring portion on the glass substrate 100 and a mounting wiring portion outside the glass substrate 100. A resistance of the wiring 22 is R12.

Gates of MN11 and MP11 are connected with the connecting node between MN12 and MP12, while gates of MN12 and MP12 are connected with the connecting node between MN11 and MP11.

Sources of the P-channel type charge transfer transistors MP11 and MP12 are connected with each other to form a common source. The ground electric potential VSS is applied as an input electric potential from the driver IC 3 to the common source through a wiring 24. The wiring 24 connects between the common source and the ground terminal VSS of the driver IC 3, and includes a wiring portion on the glass substrate 100 and a mounting wiring portion outside the glass substrate 100. A resistance of the wiring 24 is R14.

Drains of MN11 and MN12 are connected with each other to form a common drain (output terminal). The common drain is connected with a terminal of an output capacitor C13 through a wiring 23. Another terminal of the output capacitor C13 is grounded. The wiring 23 connects between the common drain and the terminal of the output capacitor C13 through a terminal P13 disposed on the glass substrate 100, and includes a wiring portion on the glass substrate 100 and a mounting wiring portion outside the glass substrate 100. A resistance of the wiring 23 is R13.

The clock DCCLK from the driver IC 3 is applied to another terminal of the flying capacitor C12, while the reverse clock XDCCLK from the driver IC 3 is applied to another terminal of the flying capacitor C11.

Figure 4:
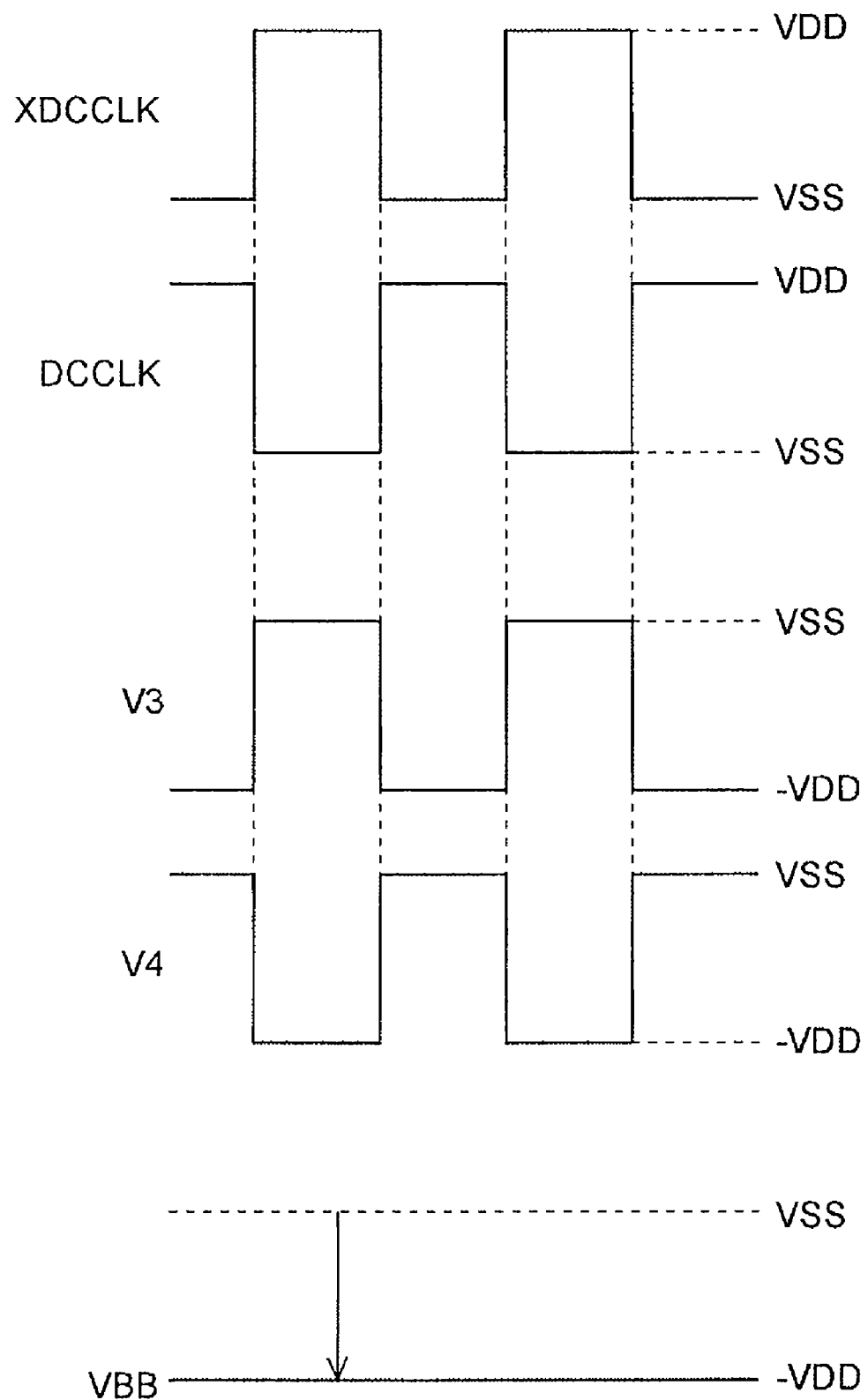
FIG. 4 is a waveform chart showing an operation of a negative power supply generation circuit according to the first and second embodiments of this invention.

A basic operation of the negative power supply generation circuit 2 described above will be explained referring to FIG. 4. When the clock DCCLK is at the L level (VSS), the reverse clock XDCCLK is at the H level (VDD), MN11 and MP12 are turned off, MN12 and MP11 are turned on, an electric potential V3 at the connecting node between MN11 and MP11 is charged to VSS and an electric potential V4 at the connecting node between MN12 and MP12 is lowered by the capacitive coupling through the flying capacitor C12 to −VDD that is outputted through MN12.

When the clock DCCLK turns to the H level, MN11 and MP12 are turned on, MN12 and MP11 are turned off, and the electric potential V3 is lowered by capacitive coupling through the flying capacitor C11 to −VDD that is outputted through MN11. Meantime, the electric potential V4 is charge to Vss. That is, the negative output electric potential VBB of −VDD is outputted by charge transferring alternately from left and right serially connected transistor circuits in the negative power supply generation circuit 2.

Transient through currents I3 and I4 flow also in the negative power supply generation circuit 2, when the clock DCCLK is inverted. (Refer to FIG. 1.) Note that a direction of each of the through currents I3 and I4 is opposite to a direction of each of the through current I1 and I2 in the positive power supply generation circuit 1, respectively.

The resistance R11 of the wiring 21, the resistance R12 of the wiring 22 and the resistance R14 of the wiring 24 are set so as to satisfy the following relations in order to suppress the transient through currents I3 and I4 as well as suppressing a rise in the negative output electric potential VBB when the clock DCCLK is inverted:

R14>R11

R14>R12

That is, the through currents I3 and I4 can be suppressed by reducing the resistances R11 and R12 so that the electric potentials V3 and V4 are quickly inverted when the clock DCCLK is inverted. Also, the through current I3 can be suppressed to suppress the rise in the negative output electric potential VBB by setting the resistance R14 to be larger than the resistances R11 and R12. In order to get enough effect to suppress the through currents I3 and I4 and to suppress the rise in the negative output electric potential VBB, it is preferable that the resistance R14 is equal to or larger than 2 times of each of the resistances R11 and R12.

The wirings 21, 22 and 24 can be formed of aluminum wirings on the glass substrate 100, for example. The wirings 21 and 22 are disposed between the negative power supply generation circuit 2 and the terminals P11 and P12, as shown in FIG. 3. The wiring 24 is disposed between the negative power supply generation circuit 2 and a power supply terminal VSS of the driver IC 3. Lengths L of the wirings 21, 22 and 24 are approximately equal to each other. The resistances R11, R12 and R14 can be adjusted to satisfy the relations described above by adjusting widths of the wirings 21, 22 and 24. That is, a width W11 of the wiring 21, a width W12 of the wiring 22 and a width W14 of the wiring 24 are set to satisfy following relations:

W14<W11

W14<W12

Second Embodiment

In the positive power supply generation circuit 1 in this embodiment, the resistance R1 of the wiring 11, the resistance R2 of the wiring 12 and the resistance R3 of the wiring 13 (an example of "fourth wiring of this invention) are set so as to satisfy the following relations in order to suppress the transient through currents I1 and I2 as well as suppressing the reduction in the positive output electric potential VPP:

R3>R1

R3>R2

That is, the through currents I1 and I2 can be suppressed by reducing the resistances R1 and R2 so that electric potentials V1 and V2 are quickly inverted when the clock DCCLK is inverted. Also, the through current I2 can be suppressed to suppress the reduction in the positive output electric potential VPP by setting the resistance R3 to be larger than the resistances R1 and R2. In order to get enough effect to suppress the through currents I1 and I2 and to suppress the reduction in the positive output electric potential VPP, it is preferable that the resistance R3 is equal to or larger than 2 times of each of the resistances R1 and R2.

The wirings 11, 12 and 13 can be formed of aluminum wirings on the glass substrate 100, for example. The wirings 11, 12 and 13 are disposed between the positive power supply generation circuit 1 and the terminals P1, P2 and P3, as shown in FIG. 3. Lengths L of the wirings 11, 12 and 13 are equal to each other. The resistances R1, R2 and R3 can be adjusted to satisfy the relations described above by adjusting widths of the wirings 11, 12 and 13. That is, the width W1 of the wiring 11, the width W2 of the wiring 12 and a width W3 of the wiring 13 are set to satisfy following relations:

$$W3<W1$$

$$W3<W2$$

Also, in the negative power supply generation circuit 2, the resistance R11 of the wiring 21, the resistance R12 of the wiring 22 and the resistance R13 of the wiring 23 are set so as to satisfy the following relations in order to suppress the transient through currents I3 and I4 as well as suppressing a rise in the negative output electric potential VBB when the clock DCCLK is inverted:

$$R13>R11$$

$$R13>R12$$

That is, the through currents I3 and I4 can be suppressed by reducing the resistances R11 and R12 so that the electric potentials V3 and V4 are quickly inverted when the clock DCCLK is inverted. Also, the through current I3 can be suppressed to suppress the rise in the negative output electric potential VBB by setting the resistance R13 to be larger than the resistances R11 and R12. In order to get enough effect to suppress the through currents I3 and I4 and to suppress the rise in the negative output electric potential VBB, it is preferable that the resistance R13 is equal to or larger than 2 times of each of the resistances R11 and R12.

The wirings 21, 22 and 23 can be formed of aluminum wirings on the glass substrate 100, for example. The wirings 21, 22 and 23 are disposed between the negative power supply generation circuit 2 and the terminals P11, P12 and P13, as shown in FIG. 3. Lengths L of the wirings 21, 22 and 23 are equal to each other. The resistances R11, R12 and R13 can be adjusted to satisfy the relations described above by adjusting widths of the wirings 21, 22 and 23. That is, the width W11 of the wiring 21, the width W12 of the wiring 22 and a width W13 of the wiring 23 are set to satisfy following relations:

$$W13<W11$$

$$W13<W12$$

Third Embodiment

The dedicated clocks are generated by the driver IC 3 in the first and second embodiments. In the third embodiment, on the other hand, the clocks DCCLK and XDCCLK to drive the power supply circuit are generated utilizing either of a horizontal clock HCLK and a vertical clock VCLK that are existing signals to generate a horizontal scan signal and a vertical scan signal in the active matrix type liquid crystal display device.

Figure 5:
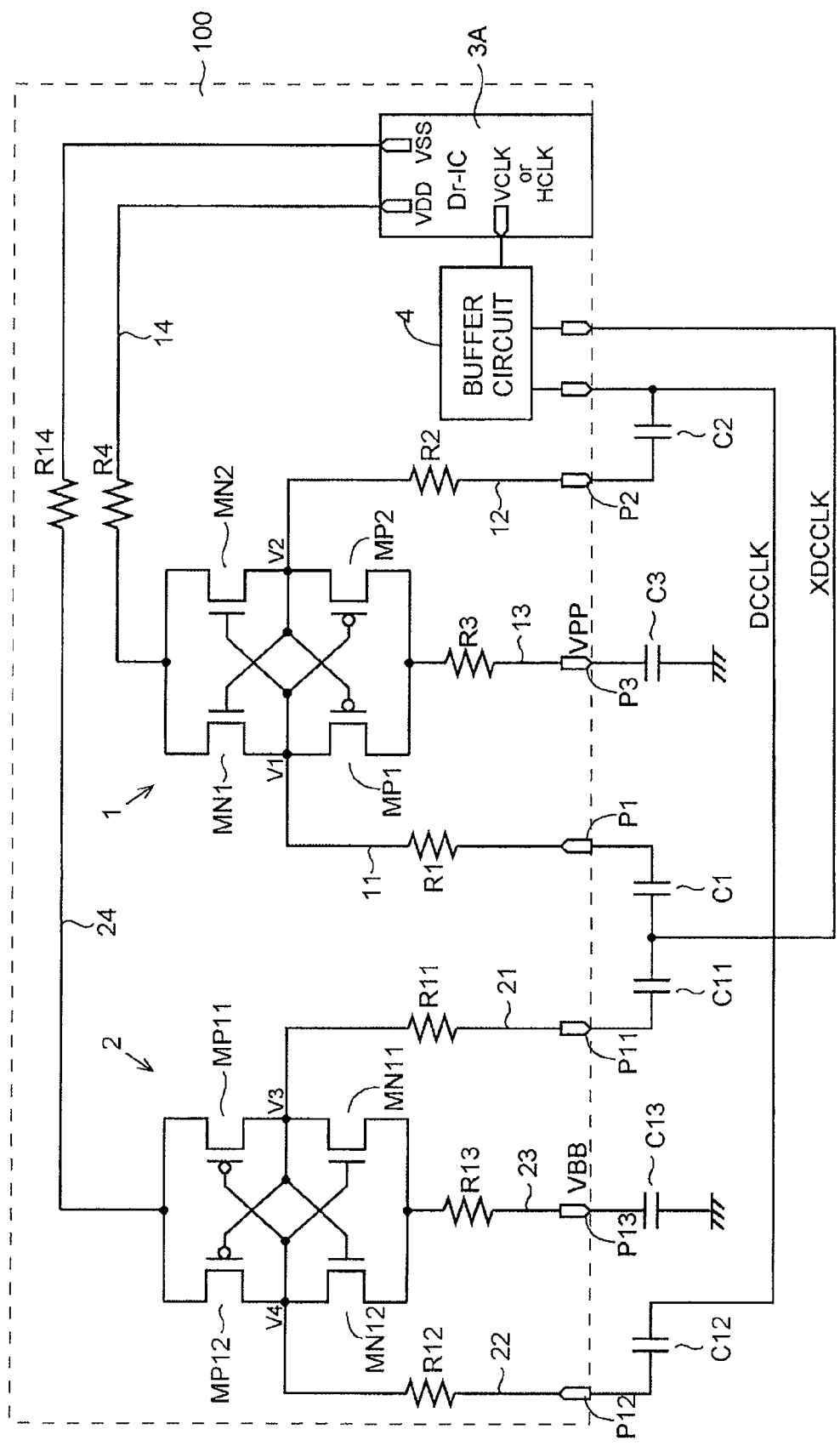
FIG. 5 is a circuit diagram of a power supply circuit according to a third embodiment of this invention.

The horizontal clock HCLK and the vertical clock VCLK are outputted from a driver IC 3A as shown in FIG. 5. In many cases, the horizontal clock HCLK and the vertical clock VCLK are not provided with high driving capacity. Thus, a waveform of the horizontal clock HCLK or the vertical clock VCLK is shaped by passing through a buffer circuit 4 (an example of "buffer circuit" of this invention) to generate the clocks DCCLK and XDCCLK to drive the power supply circuit. The buffer circuit 4 can be formed of a plurality of inverters. The clocks DCCLK and XDCCLK are applied to corresponding flying capacitors C1, C2, C11 and C12, as in the first embodiment. The driver IC 3A and the buffer circuit 4 are disposed on the glass substrate 100 in the active matrix type liquid crystal display device.

Other structures are the same as in the first embodiment or the second embodiment. The unnecessary through currents, the reduction in the output electric potential and the increase in the power consumption caused at the inversion of the clocks can be suppressed either by setting the resistances of the wirings from the flying capacitors to the power supply generation circuit to be smaller than the resistance of the wiring from the power supply terminal of the driver IC to the power supply generation circuit as in the first embodiment or by setting the resistances of the wirings from the flying capacitors to the power supply generation circuit to be smaller than the resistance of the wiring from the output capacitor to the power supply generation circuit as in the second embodiment.

Fourth Embodiment

Figure 6:
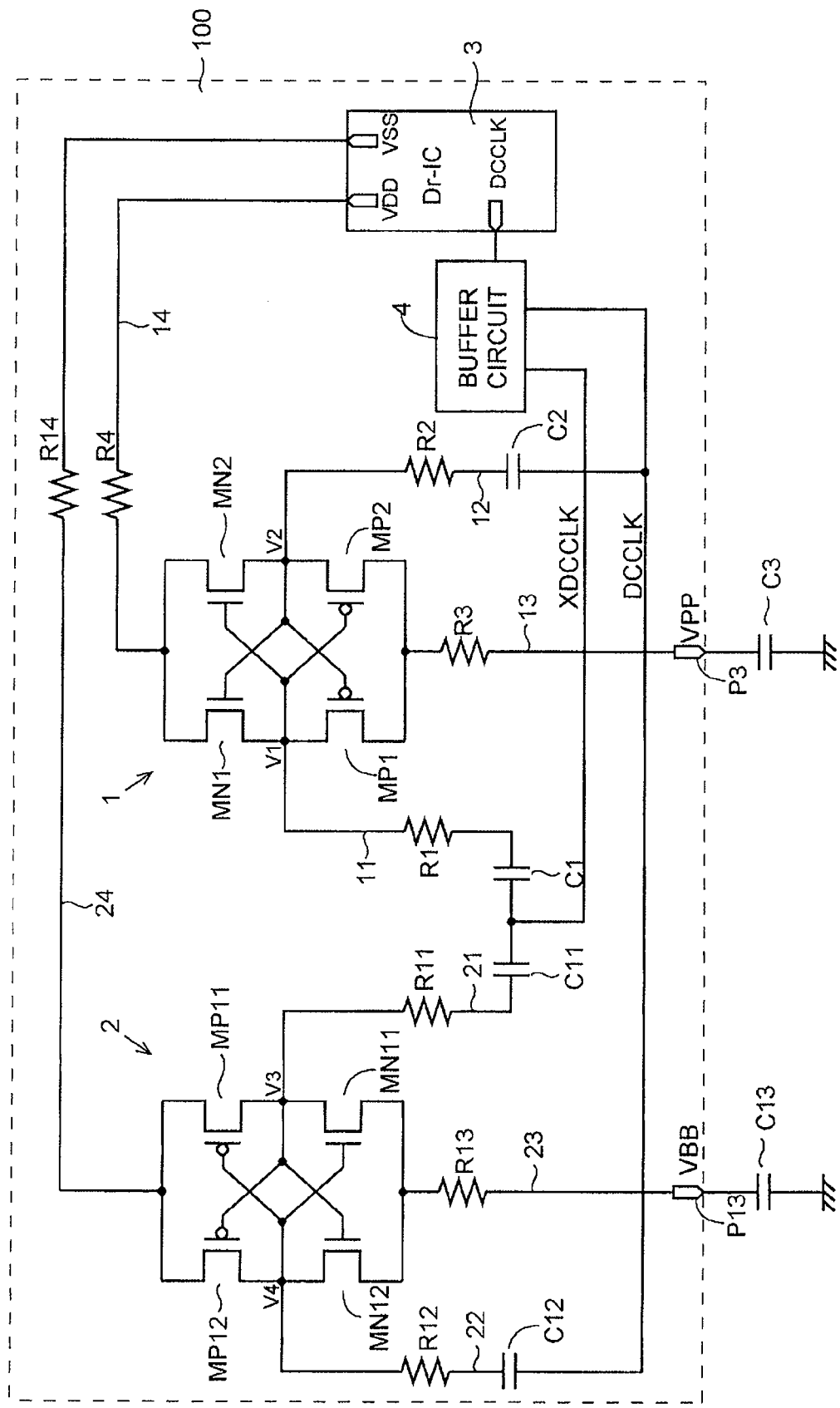
FIG. 6 is a circuit diagram of a power supply circuit according to a fourth embodiment of this invention.

In a power supply circuit according to a fourth embodiment of this invention, the flying capacitors C1, C2, C11 and C12 are formed on the glass substrate 100 in the active matrix type liquid crystal display device, as shown in FIG. 6. The flying capacitors C1, C2, C11 and C12 can be formed by the low temperature polysilicon TFT process technology. In this case, although capacitances of the flying capacitors C1, C2, C11 and C12 are limited by available patterning area, it does not matter unless the power supply circuit is required to have considerably high capacity, and a cost can be reduced by reducing the external parts.

Other structures are the same as in the first embodiment or the second embodiment. The unnecessary through currents, the reduction in the output electric potential and the increase in the power consumption caused at the inversion of the clocks can be suppressed either by setting the resistances of the wirings from the flying capacitors to the power supply generation circuit to be smaller than the resistance of the wiring from the power supply terminal of the driver IC to the power supply generation circuit as in the first embodiment or by setting the resistances of the wirings from the flying capacitors to the power supply generation circuit to be smaller than the resistance of the wiring from the output capacitor to the power supply generation circuit as in the second embodiment.

The embodiments disclosed above are only to show examples and should not be regarded as any restriction on a scope of the invention. The scope of this invention is shown by the range of claims and not by the description of the embodiment, and includes the range of the claims and all modifications in the sense of equivalents and in the scope of the invention. For example, although both the positive power supply generation circuit 1 and the negative power supply generation circuit 2 are disposed in the power supply circuit according to the first through fourth embodiments, the power supply circuit may be provided only with either one of the power supply generation circuits. Also, although the power supply circuits according to the first through the third embodiments are of a bipolar clamp method with which the output electric potential is alternately outputted from the left and right serially connected transistor circuits in response to the inversion of the polarity of the clock, this invention may be applied to a power supply circuit of a unipolar clamp method which uses a single serially connected transistor circuit.

Also, the power supply generation circuit is not limited to those described in the first through third embodiments, and may be another type of circuit as long as it converts the inputted electric potential using the flying capacitor, the clock generation circuit that provides the flying capacitor with the clock and the charge transfer transistor.

Also, the power supply circuits described in the first through third embodiments may be used in a liquid crystal display device of a TN (Twisted Nematic) mode, a VA (Vertical Alignment) mode, an IPS (In Plane Switching) mode that uses a lateral electric field or an FFS (Fringe Field Switching) mode that uses a fringe electric field. The power supply circuits may be used in a liquid crystal display device of not only a transmission type but also a reflection type or a combination of the reflection type and the transmission type. The power supply circuit may be used not only in the liquid crystal display device but also in an organic electroluminescence display device or in a field emission type display device.

With the power supply circuit according to each of the embodiments of this invention, the unnecessary through current can be suppressed as well as suppressing the insufficiency of the output electric potential and the increase in the power consumption.

What is claimed is:

1. A power supply circuit comprising:
a first charge transfer transistor and a second charge transfer transistor connected in series and formed on a substrate;
a first wiring providing a drain of the first charge transfer transistor with an input electric potential;
an output capacitor connected with a source of the second charge transfer transistor; and
a flying capacitor having a first terminal and a second terminal, the first terminal being connected with a connecting node between the first charge transfer transistor and the second charge transfer transistor through a second wiring and the second terminal receiving a clock,
wherein a resistance of the first wiring is greater than or equal to 1.5 times a resistance of the second wiring, and
the first wiring comprises a first substrate wiring portion disposed on the substrate and a first mounting wiring portion disposed outside the substrate,
the second wiring comprises a second substrate wiring portion disposed on the substrate and a second mounting wiring portion disposed outside the substrate, and
the resistance of the first wiring is adjusted by changing a width of the first substrate wiring portion, and the resistance of the second wiring is adjusted by changing a width of the second substrate wiring portion.

2. The power supply circuit of claim 1, further comprising a buffer circuit that shapes a waveform of the clock.

3. The power supply circuit of claim 1, wherein the flying capacitor is formed on a substrate on which the first and second charge transfer transistors are formed.

4. A power supply circuit comprising:
a first charge transfer transistor and a second charge transfer transistor connected in series and formed on a substrate;
a third charge transfer transistor and a fourth charge transfer transistor connected in series;
a first wiring providing a common drain of the first charge transfer transistor and the third charge transfer transistor with an input electric potential;
an output capacitor connected with a common source of the second charge transfer transistor and the fourth charge transfer transistor;
a first flying capacitor having a first terminal and a second terminal, the first terminal of the first flying capacitor being connected with a first connecting node that is a connecting node between the first charge transfer transistor and the second charge transfer transistor through a second wiring and the second terminal of the first flying capacitor receiving a first clock; and
a second flying capacitor having a first terminal and a second terminal, the first terminal of the second flying capacitor being connected with a second connecting node that is a connecting node between the third charge transfer transistor and the fourth charge transfer transistor through a third wiring and the second terminal of the second flying capacitor receiving a second clock that is opposite in phase to the first clock,
wherein gates of the first and second charge transfer transistors are connected with the second connecting node, gates of the third and fourth charge transfer transistors are connected with the first connecting node, and a resistance of the first wiring is greater than or equal to 1.5 times a resistance of the second wiring and is greater than or equal to 1.5 times a resistance of the third wiring,
the first wiring comprises a first substrate wiring portion disposed on the substrate and a first mounting wiring portion disposed outside the substrate,
the second wiring comprises a second substrate wiring portion disposed on the substrate and a second mounting wiring portion disposed outside the substrate,
the third wiring comprises a third substrate wiring portion disposed on the substrate and a third mounting wiring portion disposed outside the substrate, and
the resistance of the first wiring is adjusted by changing a width of the first substrate wiring portion, the resistance of the second wiring is adjusted by changing a width of the second substrate wiring portion, and the resistance of the third wiring is adjusted by changing a width of the third substrate wiring portion.

5. A power supply circuit comprising:
a first charge transfer transistor and a second charge transfer transistor connected in series and formed on a substrate;
a first wiring providing a drain of the first charge transfer transistor with an input electric potential;
an output capacitor connected with a source of the second charge transfer transistor through a fourth wiring; and
a flying capacitor having a first terminal and a second terminal, the first terminal being connected with a connecting node between the first charge transfer transistor and the second charge transfer transistor through a second wiring and the second terminal receiving a clock,
wherein a resistance of the fourth wiring is greater than or equal to two times a resistance of the second wiring,
the first wiring comprises a first substrate wiring portion disposed on the substrate and a first mounting wiring portion disposed outside the substrate,
the fourth wiring comprises a fourth substrate wiring portion disposed on the substrate and a fourth mounting wiring portion disposed outside the substrate, and the resistance of the first wiring is adjusted by changing a width of the first substrate wiring portion, and the resistance of the fourth wiring is adjusted by changing a width of the fourth substrate wiring portion.

6. The power supply circuit of claim 5, wherein the flying capacitor is formed on a substrate on which the first and second charge transfer transistors are formed.

7. A power supply circuit comprising:
a first charge transfer transistor and a second charge transfer transistor connected in series and formed on a substrate;
a third charge transfer transistor and a fourth charge transfer transistor connected in series;
a first wiring providing a common drain of the first charge transfer transistor and the third charge transfer transistor with an input electric potential;
an output capacitor connected with a common source of the second charge transfer transistor and the fourth charge transfer transistor through a fourth wiring;
a first flying capacitor having a first terminal and a second terminal, the first terminal of the first flying capacitor being connected with a first connecting node that is a connecting node between the first charge transfer transistor and the second charge transfer transistor through a second wiring and the second terminal of the first flying capacitor receiving a first clock; and
a second flying capacitor having a first terminal and a second terminal, the first terminal of the second flying capacitor being connected with a second connecting node that is a connecting node between the third charge transfer transistor and the fourth charge transfer transistor through a third wiring and the second terminal of the second flying capacitor receiving a second clock that is opposite in phase to the first clock,
wherein gates of the first and second charge transfer transistors are connected with the second connecting node, gates of the third and fourth charge transfer transistors are connected with the first connecting node, and a resistance of the fourth wiring is greater than or equal to two times a resistance of the second wiring and is greater than or equal to two times a resistance of the third wiring,
the second wiring comprises a second substrate wiring portion disposed on the substrate and a second mounting wiring portion disposed outside the substrate,
the third wiring comprises a third substrate wiring portion disposed on the substrate and a third mounting wiring portion disposed outside the substrate
the fourth wiring comprises a fourth substrate wiring portion disposed on the substrate and a fourth mounting wiring portion disposed outside the substrate, and
the resistance of the second wiring is adjusted by changing a width of the second substrate wiring portion, the resistance of the third wiring is adjusted by changing a width of the third substrate wiring portion, and the resistance of the fourth wiring is adjusted by changing a width of the fourth substrate wiring portion.

8. A display device comprising a power supply circuit, the power supply circuit comprising a first charge transfer transistor and a second charge transfer transistor connected in series and formed on a substrate, a first wiring providing a drain of the first charge transfer transistor with an input electric potential, an output capacitor connected with a source of the second charge transfer transistor and a flying capacitor having a first terminal and a second terminal, the first terminal being connected with a connecting node between the first charge transfer transistor and the second charge transfer transistor through a second wiring and the second terminal receiving a clock,
wherein a resistance of the first wiring is greater than or equal to 1.5 times a resistance of the second wiring,
the first wiring comprises a first substrate wiring portion disposed on the substrate and a first mounting wiring portion disposed outside the substrate,
the second wiring comprises a second substrate wiring portion disposed on the substrate and a second mounting wiring portion disposed outside the substrate, and
the resistance of the first wiring is adjusted by changing a width of the first substrate wiring portion, and the resistance of the second wiring is adjusted by changing a width of the second substrate wiring portion.

9. The display device of claim 8, wherein the power supply circuit is formed on a glass substrate by a low temperature polysilicon TFT process technology.

10. A display device comprising a power supply circuit, the power supply circuit comprising a first charge transfer transistor and a second charge transfer transistor connected in series and formed on a substrate, a first wiring providing a drain of the first charge transfer transistor with an input electric potential, an output capacitor connected with a source of the second charge transfer transistor through a fourth wiring and a flying capacitor having a first terminal and a second terminal, the first terminal being connected with a connecting node between the first charge transfer transistor and the second charge transfer transistor though a second wiring and the second terminal receiving a clock,
wherein a resistance of the fourth wiring is greater than or equal to two times a resistance of the second wiring,
the first wiring comprises a first substrate wiring portion disposed on the substrate and a first mounting wiring portion disposed outside the substrate,
the fourth wiring comprises a fourth substrate wiring portion disposed on the substrate and a fourth mounting wiring portion disposed outside the substrate, and
the resistance of the first wiring is adjusted by changing a width of the first substrate wiring portion, and the resistance of the fourth wiring is adjusted by changing a width of the fourth substrate wiring portion.

11. The display device of claim 10, wherein the power supply circuit is formed on a glass substrate by a low temperature polysilicon TFT process technology.

* * * * *